United States Patent
Kirschnek et al.

[15] 3,643,270
[45] Feb. 22, 1972

[54] PROCESS FOR DYEING ANIONIC GROUPS CONTAINING SYNTHETIC FIBER MATERIALS

[72] Inventors: Helmut Kirschnek, Leverkusen-Schlebusch; Dietrich Hildebrand, Leverkusen; Gunter Breidbach, Cologne-Flittard, all of Germany

[73] Assignee: Farbenfabriken Bayer Aktiengesellschaft, Leverkusen, Germany

[22] Filed: Feb. 12, 1969

[21] Appl. No.: 798,768

[30] Foreign Application Priority Data

Dec. 20, 1968 Germany....................P 18 15 943.8

[52] U.S. Cl..................................8/172, 8/84, 8/94, 8/177 AB
[51] Int. Cl. .................................................D06p 5/06
[58] Field of Search............8/94, 166, 172, 173, 84, 177 AB; 117/DIG. 4

[56] References Cited

UNITED STATES PATENTS

| | | | |
|---|---|---|---|
| 2,274,751 | 3/1942 | Sowter et al. | 8/173 |
| 2,384,001 | 9/1945 | Wesson | 8/173 X |
| 2,828,180 | 3/1958 | Sertorio | 8/174 X |
| 3,097,047 | 7/1963 | Weinstein et al. | 8/94 |
| 3,128,146 | 4/1964 | Bianco et al. | 8/89 X |

FOREIGN PATENTS OR APPLICATIONS

| | | | |
|---|---|---|---|
| 1,192,984 | 5/1970 | Great Britain | 8/172 |
| 634,304 | 12/1963 | Belgium | 8/84 |

OTHER PUBLICATIONS

Derwent Belgian Patents Report, No. 9/68 April 3, 1968 page 2 under Textiles (Belgium Patent No. 703,187)
H. C. Spiel, "Textile Chemicals and Auxiliaries," 2nd. Ed., 1957, Publ. Reinhold Publ. Corp. N.Y.C. pages 136, 308, 309, 392 and 398

*Primary Examiner*—George F. Lesmes
*Assistant Examiner*—T. J. Herbert, Jr.
*Attorney*—Plumley, Tyner & Sandt

[57] ABSTRACT

An improvement in the process for dyeing synthetic fibers containing anionic groups, e.g., acrylonitrile copolymers, with basic dyestuffs in chlorohydrocarbon dyebaths containing 0.1–4 percent by weight of water is obtained by utilizing a dyeing auxiliary having the formula

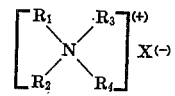

wherein $R_1$ and $R_2$, independently of one another are $C_{14}$–$C_{22}$-alkyl or $C_{14}$–$C_{22}$-alkenyl in which the total of the carbon atoms contained in $R_1$ and $R_2$ is 32–44;

$R_3$ is lower alkyl, haloalkyl or hydroxyalkyl;

$R_4$ is optionally substituted cycloalkyl, aralkyl or $C_1$–$C_4$-alkyl, or together with $R_3$ forms a 5- or 6-membered heterocycle; and $X^{(-)}$ is an anion.

7 Claims, No Drawings

PROCESS FOR DYEING ANIONIC GROUPS CONTAINING SYNTHETIC FIBER MATERIALS

The present invention relates to an exhaust process for dyeing fiber materials of anionic groups containing synthetic fiber materials with basis dyestuffs; more particularly it concerns an exhaust process wherein the dyeing is carried out in chlorohydrocarbon solutions containing, besides the basic dyestuffs, 0.1–4 percent by weight of water and quaternary ammonium compounds of the formula

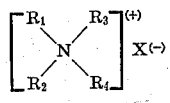

in which
$R_1$ and $R_2$, independently of one another, stand for $C_{14}$–$C_{22}$-alkyl or $C_{14}$–$C_{22}$-alkenyl radicals, with the proviso that the sum total of the carbon atoms contained in $R_1$ and $R_2$ amounts to 32–44;
$R_3$ denotes a lower alkyl, haloalkyl or hydroxy-alkyl radical;
$R_4$ stands for an optionally substituted cycloalkyl, aralkyl or $C_1$–$C_4$-alkyl, or together with $R_3$ forms a 5- or 6-membered heterocycle; and
$X^{(-)}$ is an anion.

The suitable radicals $R_1$ and $R_2$ include, as $C_{14}$–$C_{22}$-alkyl radicals, the tetradecyl, hexadecyl, octadecyl, eicosyl and docosyl radicals; as $C_{14}$–$C_{22}$-alkenyl radicals, the oleyl, linolyl, linolenyl, eicosenyl and docosenyl radicals.

The suitable radicals $R_3$ include, as lower alkyl radicals, $C_1$–$C_4$-alkyl radicals, such as the methyl, ethyl, n-propyl, and isopropyl radicals; as lower haloalkyl radicals, $C_1$–$C_3$-haloalkyl radicals, such as the 2-chloroethyl radical; and as lower hydroxyalkyl radicals, $C_1$–$C_2$-hydroxy-alkyl radicals, such as the 2-hydroxyethyl and 2-hydroxypropyl radicals.

The suitable radicals $R_4$ include, as optionally substituted $C_1$–$C_4$-alkyl radicals, for example, the methyl, ethyl, propyl, 2-hydroxyethyl, 2-hydroxypropyl, 2-methoxyethyl, 2-methoxypropyl, 2,3-epoxypropyl, chloromethyl, 2-chloroethyl, 3-chloropropyl, 2-hydroxy-3-chloropropyl, carbethoxymethyl, carbonamidomethyl, and 2-cyanoethyl radicals. Examples of optionally substituted cycloalkyl radicals are the cyclohexyl and chlorocyclohexyl radical. Examples of optionally substituted aralkyl radicals are the benzyl, 3-methyl-benzyl, and 3-chlorobenzyl radical. Examples of 5- or 6-membered heterocycles which $R_4$ may form together with $R_3$ are primarily the morpholine and piperidine rings.

Suitable anions X are primarily the halide ions, such as the chloride, bromide, iodide ions; furthermore, anions derived from sulphuric acid, acidic sulphuric acid esters and sulphonic acids, for example, the sulphate, methyl-sulphate, ethyl sulphate and toluene-sulphonate ion.

Representatives of the quaternary ammonium compounds to be used according to the invention are, for example:
N,N-dihexadecyl-N,N-dimethyl-ammonium chloride,
N,N-dioctadecyl-N,N-dimethyl-ammonium chloride,
N,N-dieicosyl-N,N-dimethyl-ammonium chloride,
N,N-didocosyl-N,N-dimethyl-ammonium chloride,
N,N-dioleyl-N-ethyl-N-methyl-ammonium bromide,
N,N-dilinolyl-N-propyl-N-methyl-ammonium iodide,
N,N-dilinolenyl-N-ethyl-N-methyl-ammonium ethylsulphate,
N,N-didocosenyl-N,N-dimethyl-ammonium chloride,
N-tetradecyl-N-docosyl-N,N-dimethyl-ammonium toluene sulphonate,
N-hexadecyl-N-eicosyl-N,N-dimethyl-ammonium bromide,
N-hexadecyl-N-octadecyl-N,N-dimethyl-ammonium chloride,
N-hexadecyl-N-oleyl-N,N-dimethyl-ammonium methylsulphate,
N,N-dihexadecyl-N-benzyl-N-methyl-ammonium chloride,
N,N-dihexadecyl-N-[2-(acetoxy)-ethyl]-N-methyl-ammonium chloride,
N,N-dihexadecyl-N-carbonamidomethyl-N-methyl-ammonium chloride,
N,N-dihexadecyl-N-cyanoethyl-N-methyl-ammonium bromide,
N,N-dihexadecyl-morpholinium bromide,
N,N-dihexadecyl-piperidinium bromide,
N,N-dihexadecyl-N-cyclohexyl-N-methyl-ammonium methylsulphate,
N,N-dihexadecyl-N-3-chlorocyclohexyl-N-methyl-ammonium bromide,
N,N-dieicosyl-N-2-hydroxyethyl-N-methyl-ammonium bromide,
N,N-dieicosyl-N-2-hydroxypropyl-N-methyl-ammonium bromide,
N,N-dieicosyl-N-2-methoxyethyl-N-methyl-ammonium iodide,
N,N-dieicosyl-N-3-methoxypropyl-N-methyl-ammonium iodide,
N,N-dieicosyl-N-2-chloroethyl-N-methyl-ammonium chloride,
N,N-dieicosyl-N-3-chloropropyl-N-methyl-ammonium chloride,
N,N-dieicosyl-N-2,3-epoxy-propyl-N-methyl-ammonium chloride,
N,N-dieicosyl-N-2-hydroxy-3-chloro-propyl-N-methyl-ammonium chloride,
N,N-dihexadecyl-N-3-methylbenzyl-N-methyl-ammonium chloride and
N,N-dihexadecyl-N-3-chlorobenzyl-N-methyl-ammonium chloride.

Technical mixtures of the compounds mentioned above, as are obtained, for example, in the quaternization of long-chain dialkylamines resulting e.g., from the hydrogenation of tallow fatty acid amides, have proved particularly satisfactory.

The compounds to be used according to the invention can be prepared by known methods (see e.g., Houben-Weyl "Methoden der Organischen Chemie," 4th Edition, Volume XI, pages 591–630).

The amounts in which the ammonium compounds to be used according to the invention are added to the dyebaths depend on the amounts of basic dyestuff used as well as on the water content of the bath. In general, it has proved expedient to use ammonium compounds and basic dyestuffs in a ratio by weight of 0.1:1 to 4:1, but the quantity of ammonium compound should at least amount to 10–50 percent by weight, preferably 25 percent by weight, of the amount of water added.

Chloro-hydrocarbons suitable for the process according to the invention are primarily those chloro-hydrocarbons the boiling point of which lies between 40° and 150° C., for example, aliphatic chloro-hydrocarbons such as methylene chloride, chloroform, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1,1,2,3,3-pentachloropropane, 1-chlorobutane, 2-chlorobutane, 1,4-dichlorobutane, 1chloro-2-methylpropane, 2-chloro-2-methylpropane, 4-chloro-2-methylpropane or 1,6-dichlorohexane; cycloaliphatic chloro-hydrocarbons, such as chlorocyclopentane or 1,4-dichlorocyclohexane; and aromatic chloro-hydrocarbons, such as chlorobenzene and chlorotoluene. Tetrachloroethylene, trichloroethylene and 1,1,1-trichloropropane have proved particularly satisfactory.

Basic dyestuffs suitable for the process according to the invention are all dyestuffs which contain at least one basic nitrogen atom. They may belong to a variety of dyestuff classes, for example, to the azo, anthraquinone, azine, oxazine, xanthene, methine, triphenylmethane and phthalocyanine dyestuffs. The term dyestuff also comprises optical brightening agents, for example, optical brightening agents of the stilbene, coumarin, azole or naphthalimide series. The dyestuffs may be present in the chloro-hydrocarbon solutions as free dyestuff bases or as salts of inorganic or organic acids.

Suitable anions for the dyestuff salts are primarily anions or inorganic acids, such as the $F^-$-, $Cl^-$-, $Br^-$-, $I^-$-, $ClO_4^-$-, $HSO_4^-$-, and $NO_3^-$-ions; furthermore, anions of acidic esters of inorganic acids, such as the methylsulphate or ethylsulphate ions; and the anions of organic acids, such as the formate, acetate or propionate ions.

The amounts in which the dyestuff bases or dyestuff salts are added to the chloro-hydrocarbon dyebaths, may vary within wide limits in accordance with the desired depth of color; in general, amounts of 0.1–8 percent by weight, referred to the weight of material to be dyed, have proved satisfactory.

It has proved to be advantageous for the dyebaths to have a pH value between 7 and 3; if this value is not reached in any case by the use of dyestuff salts, it can be adjusted by the addition of small amounts of an inorganic acid, for example, hydrochloric acid, or of an organic acid, for example, formic acid or acetic acid.

If the salts of the basic dyestuffs with inorganic acids are used as starting materials and if large amounts of dyestuffs have to be dissolved, it has frequently proved advantageous previously to dissolve them partially or to disperse them in a small amount of a hydrotropic solvent and to add them to the dyebath in this form. Examples of suitable hydrotropic solvents are isopropanol, benzyl alcohol, phenoxy ethanol, acetonitrile, hydroxy-propionitrile, dimethyl sulphoxide, dimethyl formamide or methyl glycol acetate. The amount of hydrotropic solvent used for dissolving the dyestuff salts should only be such that the quantity of hydrotropic solvent in the chlorohydrocarbon dyebaths does not amount to more than 2 percent by weight, referred to the weight of the chlorohydrocarbons.

Where levelling difficulties occur, it has proved advantageous to add to the chloro-hydrocarbon solutions also nonionic auxiliaries in an amount of 0.05–2 percent by weight, referred to the weight of the chloro-hydrocarbon. Suitable nonionic auxiliaries are primarily the known interface-active ethoxylation and propoxylation products of fatty alcohols alkyl-phenols, fatty acid amides and fatty acids as well as mixtures thereof.

By the anionic groups containing synthetic fiber materials to be dyed according to the invention there are to be understood synthetic fiber materials which can be dyed with basic dyestuffs, preferably the commercial polyacrylonitrile containing anionic groups, such as sulfonic acid, sulfimide, carboxyl and/or phosphonic acid groups. Such polyacrylonitrile containing anionic groups is described e.g., in the British Pat. Nos. 823,345, 867,006, 902,074, 933,483 and German Pat. Nos. 1,222,056 and 1,260,074. Furthermore commercial polyesters, such as polyethylene terephthalate, polycyclohexane-dimethylene terephthalate, heterogeneous polyesters of terephthalic acid, isophthalic acid and ethylene glycol or of terephthalic acid, sulfoisophthalic acid and ethylene glycol, furthermore copolyether-ester fibers from p-hydroxybenzoic acid, terephthalic acid and ethylene glycol which are modified by carboxyl and/or sulfonic acid groups, and commercial polyamides, e.g., polyhexamethylene-diamine adipate, polycaprolactam or poly-ω-amino-undecanic acid modified by sulfonic acid groups. These anionic groups containing synthetic fiber materials may also be dyed in mixture with synthetic fiber materials free of anionic groups. This fiber component is not dyed by the basic dyestuffs and can be subsequently dyed with another, nonbasic dyestuff.

The dyeing of the anionic groups containing synthetic fiber materials from chloro-hydrocarbon solutions according to the invention is preferably carried out in closed apparatus, for example, by introducing the fiber materials at room temperature into the chloro-hydrocarbon dyebath which contains the basic dyestuffs or their salts, the ammonium compounds to be used according to the invention and the water, as well as any emulsifiers and hydrotropic solvents to be used, heating the bath to 70–140° C. and maintaining this temperature until the bath is exhausted. After cooling, the liquor is removed, optionally rinsed with fresh solvent, and the fiber materials are freed from the adhering solvent by suction-filtration or centrifuging and subsequent drying in an air current.

With the aid of the process according to the invention it is possible, for the first time, to dye fiber materials of anionic groups containing synthetic fibers in various stages of processing, e.g., as loose material, combed material, yarn, piece goods, crepe or readymade goods, from chloro-hydrocarbon solutions in a simple manner with excellent dyestuff yield and outstanding levelness. A virtually complete exhaustion of the bath is achieved with short dyeing times. The resultant dyeings have a good fastness to rubbing, washing and light. Aftertreatment of the dyeings to improve the fastness properties is not necessary. The fastness properties of the dyeings can be compared with the fastness properties of corresponding dyeings from water with the use of the same dyestuffs on the same fiber materials. Another advantage consists in that the fiber materials can be precleaned, dyed, softened and provided with an antistatic finish in one operation, since the ammonium compounds to be used according to the invention are not only dyeing auxiliaries but also softeners and antistatics.

Admittedly, Belgian Pat. No. 703,187 contains a general description of a process for the dyeing of synthetic fiber materials from chloro-hydrocarbons. In this process, aqueous dyestuff solutions or aqueous dyestuff dispersions are emulsified in the chloro-hydrocarbons by means of commercial, e.g., cation-active, dispersion agents. However, the application of this process to basic dyestuff and anionic groups containing synthetic fibers does not yield satisfactory dyeings, since in this case stable emulsions cannot be prepared with the cationic products known as dispersion agents, and blotchy deposits therefore occur on the walls of the dyeing vessels as well as on the dyed material. This is also true of the dispersion agents and emulsifiers from the class of quaternary ammonium compounds hitherto known according to the state of the art.

The outstanding suitability of the ammonium compounds to be used according to the invention as auxiliaries for the dyeing from chloro-hydrocarbon solutions is surprising. On the one hand, it was not to be expected that such ammonium compounds which have never before been used as dispersion agents for dyeing, would be effective in a dyeing process where the best cationic dispersion agents fail. On the other hand, the man skilled in the art had to assume that due to the two lipophilic radicals and the resultant high affinity to the fiber, the compounds to be used according to the invention, would give rise to a substantial reservation of the anion-modified fiber materials and thus impair or completely block the absorption of the dyestuff by the fiber materials. However, under the conditions of the process, the compounds according to the invention do not lead to a blocking of the fiber, as is shown by the rapid and virtually complete exhaustion of the bath, nor do they adversely affect the migration properties of the basic dyestuff.

The parts given in the following Examples are parts by weight; the dyestuff numbers refer to the data of Color Index, Volume 3, 2nd Edition (1956). The structures of the dyestuffs or optical brightening agents characterized by the numbers (I)–(III) are given in the Table following the Examples.

The dyebaths used in the following Examples were prepared according to one of the two methods described below; according to method (a), when the basic dyestuff is present in powdered form and used without a hydrotropic solvent; according to method (b), when the dyestuff is added to the dyebath after being predissolved in a hydrotropic organic solvent.

Method (a) The basic dyestuff present in powdered form is mixed with the ammonium compound to be used according to the invention, the emulsifier optionally to be used, with the water to be used according to the invention, and with the acid which may be required. This mixture is then stirred on a boiling water bath until it is homogeneous. An aliquot part of the envisaged amount of chlorohydrocarbon is then stirred into the mixture in portions. The concentrate so obtained is then made up to the desired dyeing volume with more chlorohydrocarbon which may contain a dissolved emulsifier.

Method (b) From the basic dyestuff and the hydrotropic solvent, optionally with the use of an acid, such as formic acid, acetic acid propionic acid and/or sodium hydrogen sulphate, there is prepared a solution which is mixed with the ammonium compound to be used according to the invention, with the amount of water to be used according to the invention, and with the emulsifier optionally used. An aliquot part of the envisaged amount of chloro-hydrocarbon is stirred in portions into the mixture so obtained. The resultant concentrate is then made up to the desired dyeing volume with more chlorohydrocarbon which may contain a dissolved emulsifier.

EXAMPLE 1

100 parts of fiber yarn of anionic groups containing polyacrylonitrile (Dralon) are introduced at 22° C. into a dyebath prepared according to method (a) from
- 1 part of the dyestuffs (I)
- 2 parts N,N-dioctadecyl-N,N-dimethyl-ammonium chloride
- 7 parts of water, and
- 990 parts perchloroethylene. The bath is heated to 100° C. within 30 minutes with vivid circulation of the liquor, and the same temperature is maintained for 1 hour. The liquor is then removed, the dyed material rinsed with fresh solvent at 40° C. for 8 minutes and, after removal of the rinsing liquor, freed from the adhering solvent in an air current. A full red dyeing of good fastness properties is obtained. Compared with untreated yarn, the yarn is characterized by a soft full handle and a lower electric surface resistance.

If the 2 parts N,N-dioctadecyl-N,N-dimethyl-ammonium chloride were replaced in the dyebath with 2 parts of
N,N-dihexadecyl-N,N-dimethyl-ammonium chloride or
N,N-dioctadecyl-N,N-dimethyl-ammonium iodide or
N,N-dieicosyl-N,N-dimethyl-ammonium bromide or
N,N-didocosyl-N,N-dimethyl-ammonium chloride or
N,N-didocosyl-N,N-dimethyl-ammonium methylsulphate or
with 2 parts of a mixture prepared from equal parts of
N,N-dioctadecyl-N,N-dimethyl-ammonium chloride
and the reaction product of 1 mol nonyl-phenol with 7 mol ethylene oxide, or of
N,N-dioctadecyl-N,N-dimethyl-ammonium chloride
and the reaction product of 1 mol oleyl alcohol with 20 mol ethylene oxide,
or if 1 part 3-benzyl-4-hydroxy-diphenyl-polyethylene glycol ether was used, in addition to 2 parts N,N-dioctadecyl-N,N-dimethyl-ammonium chloride, or if only 4 parts of water were added, instead of 7 parts, then a yarn with the same quality of dyeing and antistatic finish was obtained.

EXAMPLE 2

50 parts of a fabric of anion-modified polyester (Dacron 64) are introduced at 22° C. into a dyebath prepared according to method (b) from
- 1 part of the dyestuff (II)
- 3 parts N-hexadecyl-N-octadecyl-N,N-dimethyl-ammonium chloride
- 3 parts isopropanol
- 3 parts of the reaction product of 1 mol oleyl alcohol with 20 mol ethylene oxide
- 8 parts of water and
- 982 parts perchloroethylene.

The bath is heated to 110° C. within 30 minutes with vivid circulation of the liquor, and the same temperature is maintained for 1 hour. The liquor is then removed, the dyed material rinsed with fresh solvent at 40° C. and, after removal of the rinsing liquor, freed from the adhering solvent in an air current. A red dyeing of good fastness properties is obtained.

If the 3 parts of the reaction product of 1 mol oleyl alcohol with 20 mol ethylene oxide were replaced with 3 parts of the reaction product of 1 mol nonyl-phenol with 7 mol ethylene oxide, then a dyeing of the same quality was obtained.

EXAMPLE 3

50 parts of fiber material of anion-modified polyester fibers are introduced at 22° C. into a dyebath prepared according to method (a) from
- 1 part of the dyestuff No. 51,005
- 2 parts N-eicosyl-N-docosyl-N,N0dimethyl-ammonium methylsulphate
- 2 parts of the reaction product of 1 mol oleyl alcohol with 20 mol ethylene oxide
- 1 part glacial acetic acid
- 9 parts of water, and
- 985 parts 1,1,1-trichloropropane.

The procedure described in Example 2 is otherwise followed. An intense blue dyeing is obtained. The fiber material is moreover characterized by a soft handle and, compared with the starting material, by a specific electric surface resistance (ohm/cm.) reduced by two powers of ten.

If the 2 parts of the above quaternary ammonium compound were replaced with 2 parts N-oleyl-N-eicosenyl-N,N-dimethyl-ammonium chloride, then a fiber material with the same quality of dyeing and finish was obtained.

EXAMPLE 4

50 parts of a fabric of anionic groups containing polyacrylonitrile are introduced at 22° C. into a dyebath prepared according to method (b) from
- 1 part of the dyestuff No. 48,055
- 4 parts N,N-dihexadecyl-N-cyclohexyl-N-methyl-ammonium methylsulphate
- 1 part acetic acid
- 6.5 parts isopropanol
- 4 parts of the reaction product of 1 mol oleyl alcohol with 20 mol ethylene oxide
- 7 parts of water and
- 977 parts of trichloroethylene.

The products described in Example 1 is otherwise followed. An intense yellow dyeing is obtained.

A dyeing of the same quality was obtained when the 4 parts N,N-dihexadecyl-N-cyclohexyl-N-methyl-ammonium methylsulphate were replaced with 4 parts of
N,N-dihexadecyl-N-benzyl-N-methyl-ammonium chloride or
N,N-dihexadecyl-N-2-(acetoxy)-ethyl-N-methyl-ammonium chloride or
N,N-dihexadecyl-N-carbonamidomethyl-N-methyl-ammonium chloride or
N,N-dihexadecyl-N-cyanoethyl-N-methyl-ammonium-bromide or
N,N-dihexadecyl-morpholinium bromide or
N,N-dihexadecyl-piperidinium bromide.

EXAMPLE 5

50 parts of fiber yarn of anionic groups containing polyacrylonitrile are introduced at 22° C. into a dyebath prepared according to method (a) from
- 1 part of the dyestuff No. 42,140
- 4 parts N,N-dieicosyl-N-2-methoxyethyl-N-methyl-ammonium iodide
- 1 part glacial acetic acid
- 3 parts of the reaction product of 1 mol oleyl alcohol with 20 mol ethylene oxide
- 8 parts of water and
- 983 parts perchloroethylene. The procedure described in Example 1 is otherwise followed. An intense blue dyeing is obtained.

If the 4 parts of the above quaternary ammonium compound were replaced with 4 parts of one of the following ammonium compounds:

N,N-dieicosyl-N-2-hydroxyethyl-N-methyl-ammonium bromide,

N,N-dieicosyl-N-2-hydroxypropyl-N-methyl-ammonium bromide,
N,N-dieicosyl-N-2-methoxyethyl-N-methyl-ammonium iodide,
N,N-dieicosyl-N-3-methoxypropyl-N-methyl-ammonium iodide,
N,N-dieicosyl-N-2-chloroethyl-N-methyl-ammonium chloride,
N,N-dieicosyl-N-3-chloropropyl-N-methyl-ammonium chloride,
N,N-dieicosyl-N-2,3-epoxy-propyl-N-methyl-ammonium chloride,
N,N-dieicosyl-N-2-hydroxy-3-chloropropyl-N-methyl-ammonium chloride and the 3 parts of the reaction product of 1 mol oleyl alcohol with 20 mol ethylene oxide were replaced with 2 parts of the reaction product of 1 mol nonyl-phenol with 7 mol ethylene oxide, then a dyeing of the same quality was obtained.

EXAMPLE 6

100 parts of a nonprewashed fiber yarn of anionic groups containing polyacrylonitrile are introduced at 22° C. into a dyebath prepared according to method (b) from
  1 part of the dyestuff No. 44,025
  2.5 parts N,N-dioleyl-N,N-dimethyl-ammonium chloride
  2.5 parts dimethyl formamide
  1 part glacial acetic acid
  5 parts of water and
  988 parts perchloroethylene and containing, in addition, 2 parts of the plasticizer of the formula

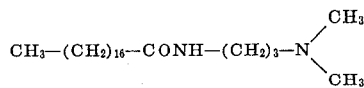

and which has been adjusted to a pH value of 5 by means of acetic acid. The procedure described in Example 1 is otherwise followed. There is obtained a fiber material which is dyed in an intense blue shade and which is distinguished from the undyed prewashed fiber yarn by an improved handle and a specific electric surface resistance (ohm/cm.) reduced by two powers of ten.

A dyeing of the same quality was obtained when the 988 parts perchloroethylene were replaced with 988 parts of
1,1,1-trichloropropane or
1,6-dichlorohexane or
1-chloro-2-methylpropane or
1,4-dichlorobutane or
1,2-dichloropropane or
1,1,2,2-tetrachloroethane.

EXAMPLE 7

50 parts of a nonprewashed fabric of anion-modified polyamide (Nylon T 844) are introduced at 22° C. into a dyebath prepared according to method (b) from
  1 part of the dyestuff (I)
  1 part N-hexadecyl-N-octadecyl-N-methyl-N-ethyl-ammonium ethyl sulphate
  1 part of the reaction product of 1 mol oleyl alcohol with 17 mol ethylene oxide
  2 parts hydroxy-propionitrile
  8 parts of water and
  987 parts of perchloroethylene and containing, in addition, 1 part of the plasticizer of the formula

and which has been adjusted to a pH value of 5 by means of glacial acetic acid. The procedure described in Example 2 is otherwise followed. A fabric is obtained, which is dyed in an intense red shade and, compared with a prewashed fabric, is characterized by a pleasant handle and a reduced specific electric surface resistance.

If the 2 parts hydroxy-propionitrile were replaced with 2 parts methyl glycol acetate or benzyl alcohol, and the 1 part of the reaction product of 1 mol oleyl alcohol with 17 mol ethylene oxide was replaced with 0.5 parts of the reaction product of 1 mol nonyl-phenol with 7 mol ethylene oxide, and a fabric of the same quality of dyeing and finish was obtained.

EXAMPLE 8

100 parts of a fiber material of anionic groups containing polyacrylonitrile are introduced at 22° C. into a dyebath prepared according to method (a) from
  1 part of the dyestuff No. 44,025
  2 parts N-tetradecyl-N-docosyl-N-methyl-N-propyl-ammonium bromide
  1 part acetic acid
  3 parts of the reaction product of 1 mol nonyl-phenol with 7 mol ethylene oxide
  10 parts of water and
  983 parts perchloroethylene. The procedure described in Example 1 is otherwise followed. An intense blue dyeing is obtained.

If the 2 parts of the above quaternary ammonium compound were replaced with 2 parts of
N-hexadecyl-N-oleyl-N,N-dimethyl-ammonium methylsulphate or
N,N-dilinolyl-N-methyl-N-propyl-ammonium iodide or
N-tetradecyl-N-docosyl-N,N-dimethyl-ammonium toluenesulphonate, a dyeing of the same quality was obtained.

EXAMPLE 9

50 parts of fiber yarn of anionic groups containing polyacrylonitrile are introduced at 22° C. into a bath prepared according to method (B) from
  0.75 parts of the whitener (III)
  3 parts N,N-dieicosyl-N,N-dimethyl-ammonium chloride
  1.25 parts isopropanol
  6 parts of water and
  989 parts perchloroethylene. The bath is heated to 95° C. within 30 minutes with vivid circulation of the liquor, and the same temperature is maintained for 1 hour. The liquor is then removed, the dyed material rinsed with fresh solvent and, after removal of the rinsing liquor, freed from the adherent solvent in an air current. A yarn is obtained which has an excellent optical brightening effect and antistatic finish as well as a soft handle.

EXAMPLE 10

50 parts of fiber yarn of anionic groups containing polyacrylonitrile are introduced at 22° C. into a bath prepared according to method (a) from
  0.75 parts of the whitener (III)
  2.25 parts N,N-dihexadecyl-N,N-dimethyl-ammonium chloride
  1 part of glacial acetic acid
  2 parts of the reaction product of 1 mol oleyl alcohol with 17 mol ethylene oxide
  8 parts of water and
  986 parts trichloroethylene and containing, in addition, 1 part of the plasticizer of the formula

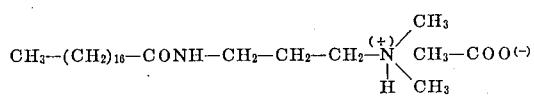

The procedure described in Example 9 is otherwise followed. The fiber material so obtained has an optical brightening effect, an antistatic finish and a soft pleasant handle.

EXAMPLE 11

50 parts of a mixed yarn of nonmodified polyester and anionic groups containing polyacrylonitrile (50:50) are introduced at 22° C. into a dyebath prepared according to method (a) from
- 0.5 parts of the dyestuff (I)
- 1 part N,N-dioctadecyl-N,N-dimethyl-ammonium chloride
- 1 part of the reaction product of 1 mol oleyl alcohol with 17 mol ethylene oxide
- 7.5 parts of water and
- 990 parts perchloroethylene. The procedure described in Example 1 is otherwise followed. The polyacrylonitrile component of the mixed yarn is dyed in a red shade of good fastness properties, whereas the polyester component remains undyed.

EXAMPLE 12

40 parts of fiber yarn of anion-modified polyacrylonitrile are introduced at 22° C. into a dyebath prepared according to method (a) from
- 0.4 parts of the dyestuff No. 48,020
- 0.8 parts of a quaternary ammonium compound obtained by quaternization of a technical dialkylamine resulting from the hydrogenation of tallow fatty acid amides, with methyl chloride,
- 0.6 parts of glacial acetic acid
- 1.2 parts of the reaction product of 1 mol oleyl alcohol with 17 mol ethylene oxide
- 4 parts of water and
- 750 parts perchloroethylene. The procedure described in Example 1 is otherwise followed. A brilliant red dyeing is obtained.

EXAMPLE 13

100 parts of woven material of anion-modified polyester are introduced at 22° C. into a dyebath prepared according to method (a) from
- 0.75 parts of the whitener (III)
- 1.75 parts N,N-dihexadecyl-N,N-dimethyl-ammonium methylsulphate
- 1.5 parts of the reaction product of 1 mol nonyl-phenol with 10 mol ethylene oxide
- 6 parts of water and
- 989 parts trichloroethylene and containing, in addition, 1 part of the plasticizer of the formula $$CH_3-(CH_2)_{16}-CONH-CH_2-CH_2-\overset{(+)}{\underset{H}{N}}(CH_3)_2\ CH_3-COO^{(-)}$$

The procedure described in Example 9 is otherwise followed.

A brightened fabric is obtained, which has a soft pleasant handle.

EXAMPLE 14

40 parts of knitted goods of a 50:50 mixture of nonmodified polyamide and anion-modified polyamide are introduced at 22° C. into a dyebath prepared according to method (b) from
- 0.6 parts of the dyestuff (I)
- 2 parts N-hexadecyl-N-octadecyl-N,N-dimethyl-ammonium chloride
- 1.2 parts of glacial acetic acid
- 0.2 parts of hydroxy-propionitrile
- 4 parts of water and
- 800 parts perchloroethylene. The procedure described in Example 1 is otherwise followed. The anion-modified polyamide component of the knitted fabric is dyed in an intense red shade, whereas the nonmodified polyamide component remains undyed.

STRUCTURES OF THE DYESTUFFS (I)-(III) USED IN THE EXAMPLES

| No. | Structure |
|---|---|
| (I) | $O_2N-C_6H_4-N=N-C_6H_3(Cl)-N(C_2H_5)(C_2H_4-\overset{(+)}{N}(CH_3)_3)\quad CH_3-OSO_3^{(-)}$ |
| (II) | $O_2N-C_6H_4-N=N-C_6H_3(CN)-N(C_2H_5)(C_2H_4-\overset{(+)}{N}(CH_3)_3)\quad CH_3-OSO_3^{(-)}$ |
| (III) | Bis-benzothiazole: $C-N=C$ with two benzothiazolium rings, N-ethyl substituted $\quad C_2H_5-OSO_3^{(-)}$ |

We claim:

1. In the exhaustion process for dyeing synthetic fiber materials containing anionic groups with basic dyestuffs from dyebaths comprising chlorinated hydrocarbons and 0.1 to 4 percent by weight of water, the improvement comprising utilizing in said dyebath a quaternary ammonium dyeing auxiliary having the formula $$\left[\begin{array}{c}R_1\quad R_3\\ \diagdown N \diagup\\ R_2\quad R_4\end{array}\right]^{(+)} X^{(-)}$$

in which
$R_1$ and $R_2$, independently of one another, are $C_{14}-C_{22}$-alkyl or $C_{14}-C_{22}$-alkenyl wherein the total of the carbon atoms $R_1$ and $R_2$ is 32–44;
$R_3$ is lower alkyl, haloalkyl or hydroxyalkyl;
$R_4$ is an optionally substituted cycloalkyl, aralkyl or $C_1-C_4$-alkyl, or together with $R_3$ forms a 5- or 6-membered heterocycle; and
$X^{(-)}$ is an anion.

2. The process of Claim 1 wherein the quaternary ammonium compounds have the formula $$\left[\begin{array}{c}R_1\quad R_3\\ \diagdown N \diagup\\ R_2\quad R_4\end{array}\right]^{(+)} X^{(-)}$$

in which
$R_1$, $R_2$ and X have the same meaning as in claim 1;
$R_3$ is methyl; and
$R_4$ is methyl or ethyl.

3. The process of claim 1 wherein N,N-dioctadecyl-N,N-dimethyl-ammonium chloride is used as the quaternary ammonium compound.

4. The process of claim 1 wherein N,N-didocosyl-N,N-dimethyl-ammonium -ammonium chloride is used as the quaternary ammonium compound.

5. The process of claim 1 wherein the quaternary ammonium compound is the quaternization product obtained by quaterization of a dialkylamine resulting from the hydrogenation of tallow fatty acid amides, with methyl chloride.

6. The process of claim 1 wherein the chloro-hydrocarbon solution contains, in addition, 0.02–2 percent by weight of a hydrotropic organic solvent.

7. Synthetic fiber materials containing anionic groups dyed according to the process of claim 1.

* * * * *